Patented Aug. 18, 1925.

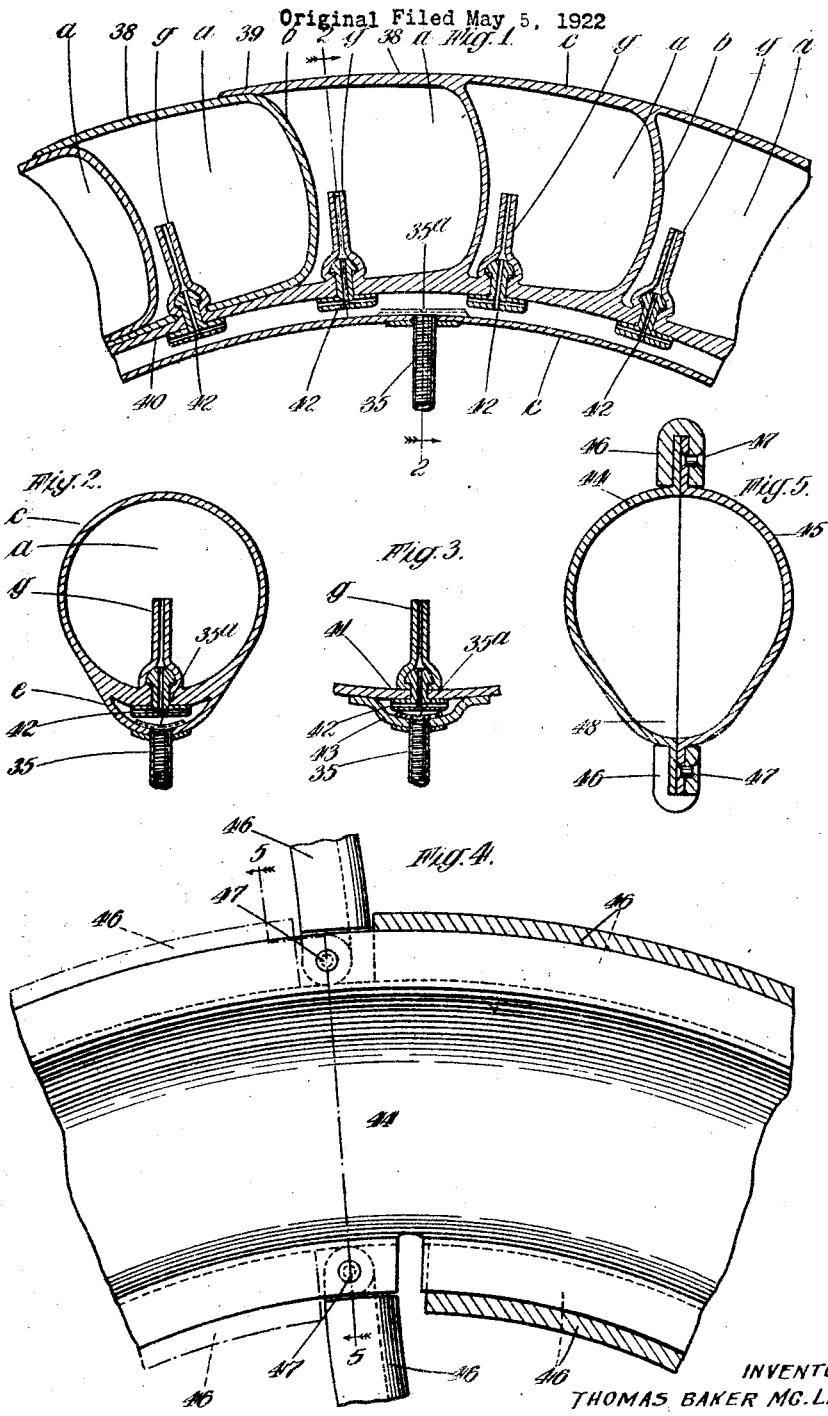

1,550,653

UNITED STATES PATENT OFFICE.

THOMAS BAKER McLEROTH, OF LONDON, ENGLAND.

METHOD OF MAKING AIR TUBES FOR PNEUMATIC TIRES.

Original application filed May 5, 1922, Serial No. 558,635. Divided and this application filed March 7, 1923. Serial No. 623,393.

*To all whom it may concern:*

Be it known that I, THOMAS BAKER McLEROTH, of "Eastburn", The Crescent, Hadley Woods, London, England, a British subject, have invented certain new and useful Improvements in or relating to the Method of Making Air Tubes for Pneumatic Tires, of which the following is a specification.

This invention relates to a method of making an air tube for a pneumatic tire, of the kind comprising a plurality of sections or compartments so arranged that the puncturing of one section or compartment will not material affect the efficiency of the tire as a whole.

Air tubes of this kind and moulds for the production thereof are described in the specification accompanying prior United States Letters Patents Nos. 1,459,544 and 1,379,929 according to which an air tube for a pneumatic tire comprises a series of sections or compartments formed by partitions, and a passage called the feed passage running around the inner periphery of the tube, and communicating with each of said sections or compartments, by way of a valveless rubber feed tube projecting into such section or compartment and adapted, on a section or compartment being punctured, to be squeezed between the partitions and bent over by them and thereby to close the communication between such section or compartment and the feed passage. The tube was preferably made in a straight length and its ends joined subsequently, and it was stated that the feed passage could be formed integrally with the air tube or by a separate portion secured to said tube. The sections or compartments were produced by means of cores which were withdrawn through splits or apertures in the walls of the compartments and these splits or apertures were, according to said prior invention, closed by a band or a series of patches applied thereto after the ends of a length of the tube had been joined to constitute an annulus; and in the forms of the invention described the splits or apertures were arranged at what, in use, would be the tread surface of the tube.

The primary object of the present invention is to facilitate the manufacture of such air tubes and to this end a tubular strip or patch which constitutes the feed passage is employed to close splits or apertures arranged at what, in use, is to be the inner periphery of the tube.

According to said prior invention the communication between each of the sections or compartments and the feed passage was by way of a valveless rubber feed tube projecting into such compartment, and as described, such feed tubes were moulded integral with the air tube one within each compartment, but by the improved method of manufacture the several apertured projections may be made integral with the tubular strip or patch and adapted to project into said compartments through splits or apertures in the air tube.

According to the present invention the tube proper and the tubular strip or patch, after being built up as separate integers, the tube proper of raw rubber, the tubular strip or patch also of raw rubber, and the valveless feed tubes on the latter of partially-vulcanized rubber, are united by solution or otherwise and vulcanized simultaneously as a single unit without the use of solid cores during that process.

To this end the tube may be built up by arranging cores and discs of raw india-rubber alternately in a series (preferably in an annulus), solutioning the edges of said discs, wrapping a sheet of raw rubber around the assemblage, and after the solution has set, withdrawing the cores through slits or apertures made in the sheet of raw rubber either before or after it is wrapped around the assemblage, or left between the edges of the sheet when the latter is applied about the assemblage. Preferably, in order to avoid tearing the raw rubber, the cores are made in sections so as to be collapsible e. g. after the fashion of a boot tree.

Alternatively, the tube with its partitions or diaphragms may be built up from a series of raw rubber cups, the closed end of one of which is inserted into the open mouth of another and so on around the series. The cylindrical wall of each cup is preferably tapered away to a feather edge at the mouth of the cup, and said tapered part is solutioned to the outside of the cylindrical wall of the next cup and so on. The wall of each cup is formed with an aperture through which may project a rubber tube formed integrally with the tubular strip or patch as before.

The tubular strip or patch may be built up by solutioning together at their longitudinal margins strips of raw india rubber the contiguous surfaces between said solutioned margins being treated with French chalk or the like to prevent mutual adhesion, and if desired a further layer or layers may be built up thereon. If desired the building up of these layers may be effected about a mandrel which is subsequently withdrawn. Opposite suitable apertures in one of said strips short lengths of rubber tubing are solutioned by their ends so as to project at right angles from the strip, these lengths of rubber tubing having been partially vulcanized before hand for a reason which will hereinafter appear.

The invention is illustrated by the accompanying drawings wherein Figure 1 is a section, of one form of tube, on the central plane intersecting at right angles the axis of rotation of the wheel to which the tube is to be applied, Figure 2 is a cross-section on the line 2—2, Figure 1, Figure 3 is a sectional view of a detail, Figure 4 is a similar view to Figure 1 shewing part of the mould for the production of the tube and Figure 5 is a cross-section on the line 5—5, Figure 4.

In accordance with the form of the invention illustrated in Figures 1, 2 and 3, the tube proper $c$ with its partitions $b$ ... is built up from a series of raw rubber cups 38, the closed end of one of which is inserted in the open mouth of another as shewn at the left hand side of Figure 1, and so on around the series. The cylindrical wall of each cup 38 is preferably tapered away to a feather edge at the mouth of the cup as shewn at 39, and said tapered part is solutioned to the outside of the cylindrical wall of the next cup 38 and so on. The wall of each cup 38 is formed with an aperture 40 through which may project a feed tube $g$ formed integrally with a tubular strip or patch $e$, as follows. A strip of raw rubber 41 having been suitably punctured with a series of small apertures along the centre of its length has introduced through said punctures a series of studs 42 ... constructed e. g. as described and claimed in the specification of the concurrent application for Letters Patent Serial No. 573,238, filed July 6, 1922. The strip 41 having been treated with French chalk as above set forth is then solutioned at its longitudinal margins to another similarly treated strip 43 (or built up strips) as shewn in Figure 3 and the ends of partially vulcanized lengths of tubing $g$ having been solutioned are pressed over the heads of the studs 42 so as to contact with the strip 41.

When the solution has set the strip 41 is solutioned to the tube made up of raw rubber cups 38 ... in such a position that each length of rubber tubing $g$ projects into a section or compartment $a$ through an aperture 40 in the wall thereof and so that these apertures are closed by the strip 41 and the edges of the strips 41 and 43 are trimmed off.

The tube $c$ is built up as an annulus whilst the tubular strip or patch $e$ may be built up as a straight length and applied to the inner peripheral surface of the annular tube $c$, the ends of said tubular strip or patch $e$ being butt-jointed and solutioned together.

The assemblage (a non-return inflation-valve 35 having been mounted on the part 43 of the tubular strip or patch $e$ said valve being of ordinary construction save that its base is notched as shewn at $35^a$) is then placed within a mould as shewn in Figures 3 and 4 and comprising two flanged annular sections 44 and 45 divided on a substantially central plane and adapted to be clamped together by clips 46 pivoted at 47, said sections 44 and 45 being so formed, at those parts which correspond with the inner periphery of the tube as to provide a peripheral recess 48 for the accommodation of the tubular strip or patch $e$. After these sections have been clamped together the tube $c$ is inflated somewhat, preferably to a pressure of about 20 lbs. per square inch, and the mould 44, 45 is placed in a vulcanizer.

During the vulcanizing process the heat causes the internal pressure to rise, but the tube $c$ is restrained by the mould 44, 45 against bursting; the heat also causes the contiguous edges of the built-up portions of rubber to unite as shewn at the right hand side of Figure 1 but as the lengths of rubber tubing $g$ have been already partially vulcanized they are able to retain their projecting positions without risk of collapsing and becoming either accidentally closed or united with the adjacent interior walls of the compartments $a$.

I claim:—

1. A method of producing an air tube for a pneumatic tire, which consists in combining a plurality of sections of raw rubber to form an air tube proper having a series of compartments, the inner periphery of said air tube proper being provided with apertures opening into said compartments; building up, also from raw rubber, and as a separate integer, a tubular patch adapted to close said apertures; mounting valveless feed tubes of partially vulcanized rubber on said tubular patch; uniting said tubular patch with said air tube proper and causing said valveless feed tubes to project through said apertures, one into each compartment; and vulcanizing said air tube proper, said tubular patch and said valveless feed tubes, simultaneously and as a single unit, without the use of solid cores during that process.

2. A method of producing an air tube for a pneumatic tire, which consists in combining a series of raw rubber cups by inserting the closed end of one cup into the open end of an adjacent cup to form an air tube proper having a series of compartments, the inner periphery of said air tube proper being provided with apertures opening into said compartments; building up, also from raw rubber, and as a separate integer, a tubular patch adapted to close said apertures; mounting valveless feed tubes of partially vulcanized rubber on said tubular patch; uniting said tubular patch with said air tube proper and causing said valveless feed tubes to project through said apertures, one into each compartment; and vulcanizing said air tube proper, said tubular patch and said valveless feed tubes, simultaneously and as a single unit.

3. A method of producing an air tube for pneumatic tire, which consists in building up, of raw rubber, an air tube proper having a series of compartments and being provided at its inner periphery with apertures opening into said compartments, building up, also from raw rubber, and as a separate integer, a tubular patch adapted to close said apertures; mounting on said tubular patch valveless feed tubes of partially vulcanized rubber; uniting said tubular patch with said air tube proper and causing said valveless feed tubes to project through said apertures, one into each compartment; and vulcanizing said air tube proper, said tubular patch and said valveless feed tubes, simultaneously and as a single unit, said tubular patch being built up by solutioning together, at their longitudinal margins, strips of raw rubber, the contiguous surfaces between said solutioned margins being treated to prevent mutual adhesion, solutioning short lengths of partially vulcanized rubber tubing by their ends to one of said strips and opposite suitable apertures therein, said short lengths of partially vulcanized rubber tubing projecting at right angles from said strip.

THOMAS BAKER McLEROTH.